Patented Sept. 8, 1936

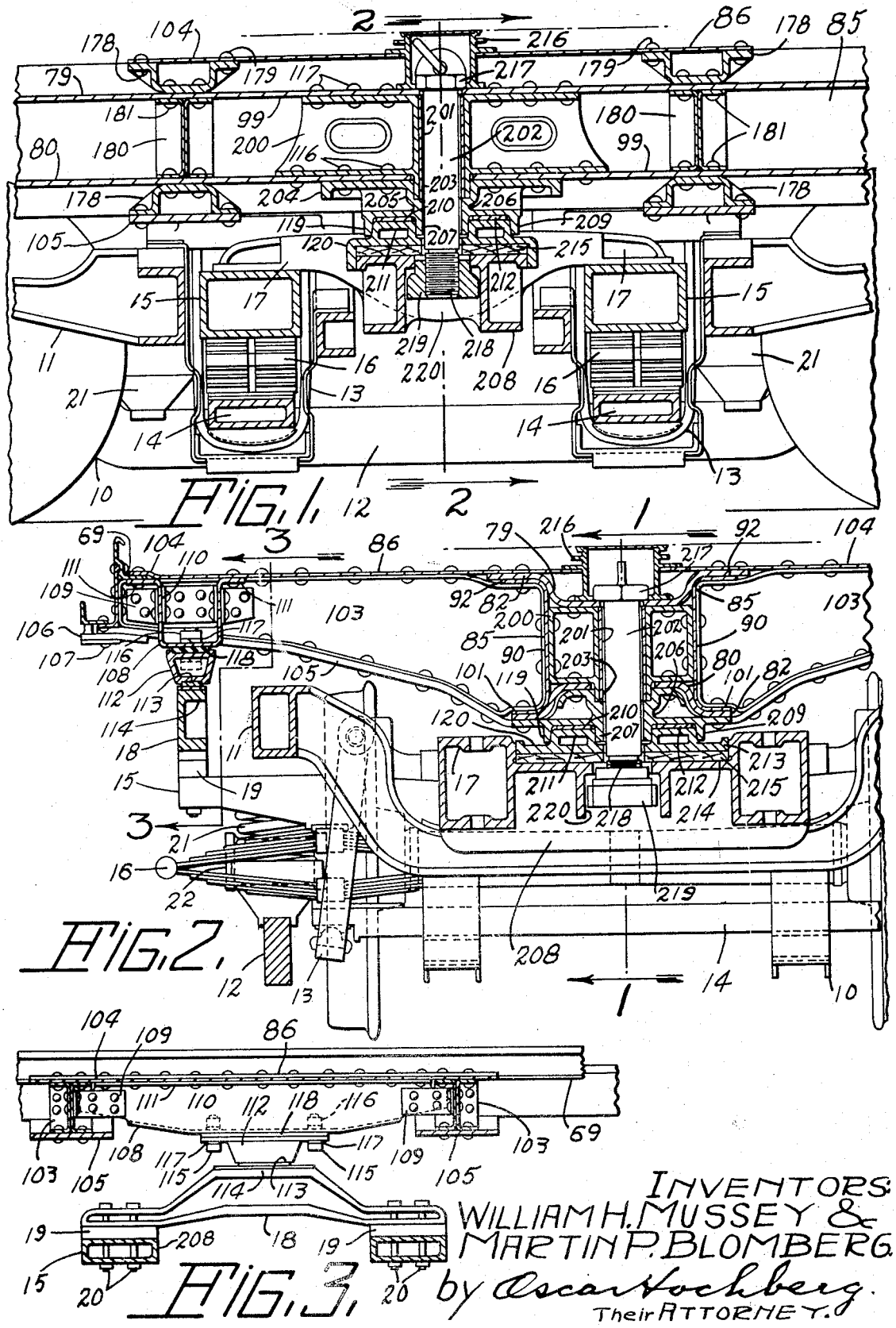

2,053,731

UNITED STATES PATENT OFFICE 2,053,731

BOLSTER CONNECTION

William H. Mussey and Martin P. Blomberg, Chicago, Ill., assignors to Pullman-Standard Car Manufacturing Company, a corporation of Delaware Original application June 17, 1933, Serial No. 676,265. Divided and this application July 23, 1934, Serial No. 736,470

10 Claims. (Cl. 105—199)

This application is a division of our copending application Serial No. 676,265, filed June 17, 1933.

The invention broadly relates to vehicles utilizing a connection of the type permitting relative swiveling movement between the vehicle and a supporting truck.

More particularly the invention contemplates vehicle and truck connections wherein swiveling center bearings are used in conjunction with side bearings for maintaining the proper vertical relationship between vehicle and truck.

An object of the invention is the provision of a center bearing wherein the bearing surfaces of the respective center plates comprising such center bearing are effectively protected from the elements and maintained free of foreign matter and moisture from without.

An important object of the invention is the provision of a pivotal connection for use between a vehicle and its supporting truck wherein a self-contained source of lubrication is provided requiring no additional lubricant other than that provided thereby.

A further object of the invention is to provide friction type side bearings having a more favorable coefficient of friction obtained by the use of bearings comprised of metal charged with a permanent supply of lubricant.

Another object is so to dispose and connect the several parts entering into the respective side bearing assemblies as to maintain contact between car body and truck at all times while providing for the necessary movement therebetween by means of a resilient cushion interposed in the side bearing at a point between body and truck.

The foregoing and other objects are attained by the mechanism illustrated in the accompanying drawing in which—

Figure 1 is a vertical, longitudinal, sectional view thru a railway car truck and body connection taken on the line 1—1 of Figure 2 and showing the truck and body center plate and bolster construction;

Figure 2 is a vertical, transverse, sectional view taken on the line 2—2 of Figure 1 showing the relationship between the center and one side bearing, the bearing on one side being broken away; and Figure 3 is a longitudinal, sectional view taken on the line 3—3 of Figure 2 showing the side bearing and brace in elevation.

The drawing illustrates a railway car and truck construction for use in passenger cars of the type employing a supporting truck at each end in pivotal relationship to the car although the invention may with equal facility be applied to cars of the articulated type or to freight cars.

As the trucks and that portion of the vehicle underframe adjacent thereto are the same at each end of the vehicle, only one is shown and described.

The truck 10 is of a well-known type used extensively in passenger cars and, in the embodiment illustrated, includes the truck frame 11 resiliently supported upon springs 21 upon equalizers 12 supported from the axle journals 22 in a well-known manner. Suspended from the truck frame 11 by swing hangers 13 are spring planks 14 resiliently supporting the truck bolsters 15 through the medium of leaf springs 16 interposed between the spring planks and respective bolsters. Mounted upon and connecting the bolsters 15 at the center of the truck is a bolster spider 17 forming with said bolsters 15 a double truck bolster 208 capable of vertical and lateral movement by means of springs 16 and swing hangers 13 respectively. At their ends the bolsters 15 are connected by side bearing arches 18 seated upon blocks 19, of wood or other sound-deadening material and secured by bolts 20 to the bolsters 15, all as in customary practice. The truck bolster 208 accommodates a center bearing 120 adapted for swiveling engagement with a complemental bearing 119 on the double body bolsters 86 of the vehicle underframe.

The top chord 79 and bottom chord 80 of the center sill are channel-shaped with their flanges 81 bent laterally to provide horizontal securing flanges 82, the channels respectively opening upwardly and downwardly and spaced apart by the pressed channel draft sill members 85 which extend entirely through the body bolsters 86 and, as indicated in Figure 2, have their upper and lower flanges 92 and 101 secured to and between outwardly extending flanges 82 of the respective sill chords 79 and 80 to form with such chords a box girder sill portion framed into the bolsters to provide a rugged column having open channel faces upon all of its sides. The bottom channel face is adapted to receive the center bearing plate 119 and filler blocks 178 beneath the web 99 of the bottom chord 80, and the side channel faces of the draft sills 85 receive the inner ends of bolster diaphragms 103 while the upper channel face of sill chord 79 receives the filler blocks 178 and king pin keeper 216.

The bolsters 86 comprise each the diaphragms 103 placed back to back and extending between the center and side sills, the sills and diaphragms being connected by a top cover plate 104 extending from side to side and bolster to bolster to provide a unitary assembly. The undersides of the bolsters are covered by separate compression plates 105 extending beneath and tying together the sills and diaphragms and fitted at their respective, opposite ends with jacking pads 106 secured to the plates and adjacent side sills by rivets 107. For the purpose of rigidifying the bolster assembly at the center bearing position, a bearing filler block 200 is inserted between the sill chord webs 99 and formed with a tubular pin bearing 201 for a king pin 202, the bearing having an extended lower portion 203 projected through the lower sill web for interlocking engagement with the body center bearing plate 119 nested within the lower chord channel of the center sill and secured to web 99 and lower portion of the filler by rivets 116, the filler block on its upper side being secured to adjacent top chord web 99 by rivets 117, the top cover plate 104 and both sill webs having openings registering with the tubular bearing 201 for reception of the king pin 202.

In the form illustrated in Figures 1 and 2, the body center bearing plate 119 is provided with a filler block and sill reenforcing portion 204 nested within the lower face of the center sill and shaped with a socket portion 205 in its upper face to receive the projected sleeve portion 203 of the king pin bearing 201 on the bolster filler block 200. Beneath the socket 205, the center plate is formed with a tubular portion 206 extending downwardly below the base of the plate to provide a second projection 207 for swiveling engagement with the center bearing plate 120 supported upon the truck bolster 208.

The body center bearing plate 119 is further provided with an annular depending flange portion 209 in concentric relation to the sleeve projection 207 and defining between them a swivel bearing portion 210 for the reception of a complemental, upstanding bearing portion 211 on the truck center bearing plate. Between the swivel bearing portions 210 and 211 of the body and truck center plates is interposed a lubricating plate 212 adapted to be held from displacement by the concentric flange 209 and sleeve projection 207 on the body plate. The particular lubricating plate shown is in the nature of a metallic sponge formed by mixing powered metals and graphite in predetermined proportion which, under very high unit pressures, is formed into the shape desired, heat treated and impregnated with oil, after which it is finished to the dimension required. The high oil content of this plate renders it particularly suitable for use in the bearing plate assembly as it provides a hydraulic cushion to sustain the severe pressures imposed by the shock or impact loads encountered in service and, by virtue of a minimum of friction resulting from its use, permits greater freedom of relative movement between the several bearings.

Thus positioned, the bearing surfaces of the center plates are protected from the elements whereby complete lubrication of these surfaces may be effected and maintained free from dirt and moisture from without. The oil released by the lubricating plate 212 finds its way between the walls of bearing 211 on the truck center plate and contiguous bearing faces on concentric flanges 207 and 209 on the body center plate. The truck center bearing plate 120 has a base plate portion 213 held in recess 214 in the truck bolster 208 and preferably mounted upon a shim plate 215 of wood or the like also within the recess 214 as shown in Figure 2.

The whole assembly, including the truck bolster 208, truck and body center bearing plates 120 and 119 and interposed lubricating plate 212, the bolster filler block 200 and body bolster 86, is held operatively connected by the locking king pin 202 held from rotation within the tubular bearings 201 and 206 by keepers 216 resting upon upper chord 79 of the center sill and engaging one side of the polygonal head 217 on the pin.

The pin projects downwardly into the truck bolster and is provided at its lower end with a threaded portion 218 fitted with a polygonal nut 219 nested in socket 220 on the truck bolster so that as the truck swivels about the king pin the nut will turn with it without disengagement from the pin. The structure at the bolster position is further strengthened against possible distortion of the cover plates 104 above the center sill. The cover plates normally function in tension, but when the car is supported upon jacks at the jacking pads 106 at the ends of the bolsters, the cover plates 104 are placed in compression.

Therefore, to prevent buckling of the cover plates, top and bottom, at the point where they bridge the upper and lower troughs of the center sill, suitable filler blocks 178 are inserted fore and aft of the plates between the plates and webs 99 of the top and bottom chords 79 and 80, as best shown in Figures 1 and 2, and secured to both plates by the several rivets 179 to insure proper transmission of the stresses thus imposed. At the bolster diaphragm positions, the draft sills 85 and center sill top and bottom chords 79 and 80 are further held in proper, spaced relation by bolster filler pans 180 secured to webs 90 of the draft sills and webs 99 of the sill chords. The rivets 181, securing the pans to the top chord web, also connect the respectively adjacent filler blocks 178 to the sill, as indicated in Figure 1.

The bolsters 86 adjacent their ends are further united and braced by hollow side bearing beams 108 connected to the bolsters by angle clips 109 secured to the webs of diaphragms 103 and side walls 110 of the beams. The beams are preferably channel-shaped with their side walls flanged outwardly at 111 for connection with the bolster top cover plate 104 to form therewith a box girder construction providing a rigid column for distributing shocks of impact and substantially reinforcing the bolster assembly, the outer flanges of the beams being spaced from adjacent margins of the top cover plate to secure upper flanges 69 of the side sills between them for a more complete integration of the underframe elements in the bolster area. As shown in Figure 3, the side bearing beams 108 are fitted with side bearing shoes 112 recessed on their bearing faces to accommodate a suitable lubricating insert 113 of the same type as provided for the center bearing and adapted for frictional contact with underlying truck side bearings 114.

The shoes 112 are yieldably held to the hollow beams 108 by bolts 115 provided with securing nuts 116 and suitable spring washers 117 having bearing upon the nuts inside of the beams and the bolt heads at the shoes so that upon compression of the rubber cushion 118 between the beams and shoes under pressure of the truck side bearings 114 during swaying movements of the car body, the shoes will yield to such movement but the bolts securing them will be held taut and the slack created by the upward thrust of the bolts taken up by the spring washers 117, to prevent the clash of metal parts resulting in cases where no provision is made for cushioning the blows or taking up slack in the securing members.

With the arrangement described, it is possible to maintain, at all times, a cushioned contact between body and truck bolsters at the side bearings with the body center bearing plate 119 in bearing engagement with the supporting truck center bearing plate 120, as best illustrated in Figure 2.

What we claim is:

1. In railway car construction, the combination comprising an underframe having a center sill, a bolster mounted upon said sill and comprising diaphragms spaced apart on opposite sides of and connected to the center sill, a bolster top cover plate uniting said diaphragms and sill, a separate bottom cover plate connecting said diaphragms and sill, a body center bearing plate mounted beneath the center sill at the bolster position, and a car truck including a bolster having a center bearing plate in complementary relation to said body center plate, and a lubricating plate between said center plates.

2. In railway car construction, the combination comprising an underframe having a center sill, a bolster mounted upon said sill and comprising diaphragms spaced apart on opposite sides of and connected to the center sill, a bolster top cover plate uniting said diaphragms and sill, a separate bottom cover plate connecting said diaphragms and sill, a body center bearing plate mounted beneath the center sill at the bolster position, and a car truck including a bolster having a center bearing plate in complementary relation to said body center plate, a lubricating plate between said center plates, and a locking king pin connecting said underframe, center plates and truck bolster.

3. In railway car construction, the combination comprising an underframe having a center sill, double body bolsters mounted upon said sill, unitary bolster top cover plates uniting said bolsters and sill, separate bottom cover plates connecting said bolsters and sill, side sill members connecting said bolsters and cover plates, braces connecting said bolsters extending parallel to and adjacent the side sills, body center bearing plates mounted beneath the center sill, resilient body side bearings mounted upon said braces, and car trucks including bolsters having center and side bearings complementing said body center and resilient side bearings.

4. In railway car construction, the combination comprising an underframe having a center sill, double body bolsters mounted upon said sill, unitary bolster top cover plates uniting said bolsters and sill, separate bottom cover plates connecting said bolsters and sill, side sill members connecting said bolsters and cover plates, braces connecting said bolsters extending parallel to and adjacent the side sills, body center bearing plates mounted beneath the center sill, body side bearings mounted upon said braces, car trucks including bolsters having center and side bearings complementing said body center and side bearings, and oil bearing plates between the cooperating surfaces of all of said bearings.

5. In railway car construction, an underframe having a center sill comprising top and bottom chord members of flanged channel configuration with their respective webs disposed horizontally in vertical spaced relation, channel-shaped side wall members connecting said top and bottom chords and forming therewith a box-shaped girder having recessed top, bottom and side wall faces, double body bolsters mounted upon said sill and comprising diaphragms spaced apart on opposite sides of the sill with portions thereof entered in the center sill side wall recesses, unitary bolster top cover plates connecting said diaphragms and sill, separate bottom cover plates connecting said diaphragms and sill, filler blocks within said center sill having a tubular pivot bearing with a portion thereof extending downwardly through the sill bottom chord, a body center bearing plate nested within said lower chord member adapted to receive said pivot bearing extension, a truck bolster center bearing plate in engagement therewith, a lubricating plate between said center plates, and a locking king pin connecting said underframe, center plates and truck bolster.

6. In railway car construction, an underframe having a center sill comprising top and bottom chord members of flanged channel configuration with their respective webs disposed horizontally in vertical spaced relation, channel-shaped side wall members connecting said top and bottom chords and forming therewith a box-shaped girder having recessed top, bottom and side wall faces, double body bolsters mounted upon said sill and comprising diaphragms spaced apart on opposite sides of the sill with portions thereof entered in the center sill side wall recesses, unitary bolster top cover plates connecting said diaphragms and sill, separate bottom cover plates connecting said diaphragms and sill, filler blocks within said center sill having a tubular pivot bearing with a portion thereof extending downwardly through the sill bottom chord, a body center bearing plate nested within said lower chord member adapted to receive said pivot bearing extension, a truck bolster center bearing plate in engagement therewith, and a lubricating plate between said center plates.

7. In railway car construction, the combination comprising an underframe having a center sill including top and bottom chord members of flanged channel configuration with their respective webs disposed horizontally in vertical spaced relation, channel shaped side wall members connecting said top and bottom chords and forming therewith a box-shaped girder having recessed top, bottom and side wall faces, double body bolsters mounted upon said sill and comprising diaphragms on opposite sides of the sill with portions thereof entered in the center sill side wall recesses, unitary bolster top cover plates uniting said diaphragms and sill, separate bottom cover plates connecting said diaphragms and sill, filler blocks within said center sill having a tubular pivot bearing with a portion thereof extending downwardly thru the sill bottom chord, a body center bearing plate nested within said lower chord member adapted to receive said pivot bearing extension, side sill members connecting said bolsters and cover plates, hollow diaphragm braces between said bolster diaphragms parallel to and adjacent the side sills and connecting said top cover plate and diaphragms, body side bearing members resiliently connected to said hollow diaphragm braces, and a car truck including a bolster having center and side bearings, engageable respectively with said body center and side bearings, and lubricating plates between the supporting surfaces of all of said bearings.

8. In railway car construction, an underframe having a center sill comprising top and bottom chord members of flanged channel configuration with their respective webs disposed horizontally in vertical spaced relation, channel-shaped side wall members connecting said top and bottom chords and forming therewith a box-shaped girder having recessed top, bottom and side wall faces, double body bolsters mounted upon said sill and comprising diaphragms spaced apart on opposite sides of the sill with portions thereof entered in the center sill side wall recesses, unitary bolster top cover plates uniting said diaphragms and sill, separate bottom cover plates connecting said diaphragms and sill, filler blocks within said center sill having a tubular pivot bearing with a portion thereof extending downwardly through the sill bottom chord, and a center bearing plate nested within said lower chord member adapted to receive said pivot bearing extension.

9. In railway car construction, an underframe having a center sill comprising top and bottom chord members of flanged channel configuration with their respective webs disposed horizontally in vertical spaced relation, channel-shaped side wall members connecting said top and bottom chords and forming therewith a box-shaped girder having recessed top, bottom and side wall faces, double body bolsters mounted upon said sill and comprising diaphragms on opposite sides of the sill with portions thereof entered in the center sill side wall recesses, unitary bolster top cover plates uniting said diaphragms and sill, separate bottom cover plates connecting said diaphragms and sill, filler blocks within said center sill having a tubular pivot bearing with a portion thereof extending downwardly thru the sill bottom chord, a center bearing plate nested within said lower chord member adapted to receive said pivot bearing extension, side sill members connecting said bolsters and cover plates, and hollow diaphragm braces between said bolster diaphragms parallel to and adjacent the side sills and connecting said top cover plate and diaphragms.

10. In railway car construction, an underframe having a center sill comprising top and bottom chord members of flanged channel configuration with their respective webs disposed horizontally in vertical spaced relation and providing recessed top, bottom and side faces, double body bolsters mounted upon said sill and comprising diaphragms on opposite sides of the sill with portions thereof entered in the recessed side faces thereof, side sill members connecting said bolsters, top and bottom cover plates connecting said diaphragms and sills, hollow diaphragm braces between said bolster diaphragms parallel to and adjacent the side sills, filler blocks within said center sill having a tubular pivot bearing with a portion thereof extending downwardly thru the sill bottom chord, a center bearing plate nested within said lower chord member adapted to receive said projected bearing extension and formed on its underside with depending concentric annular flanges defining a circular bearing area between them for the reception of a truck bolster center bearing, and a lubricating plate between said flanges.

WILLIAM H. MUSSEY.
MARTIN P. BLOMBERG.